HENRY PEMBERTON, OF ALLEGHENY CITY, PENNSYLVANIA.

Letters Patent No. 82,747, dated October 6, 1868.

IMPROVED POROUS ALUM.

The Schedule referred to in these Letters Patent and making part of the same.

*To all whom it may concern:*

Be it known that I, HENRY PEMBERTON, of the city of Allegheny, in the county of Allegheny, and State of Pennsylvania, have invented a new and useful article of manufacture, called Porous Alum; and I do hereby declare the following to be a full, clear, and exact description thereof.

My invention consists in the production, as a new article of manufacture, of the sulphate or other uncrystallized soluble salt of alumina, prepared in such manner as to assume a novel and peculiar form of mechanical structure, whereby certain important benefits result in the practical use and consumption thereof in the arts and manufactures. To this new manufacture I give the name of "porous alum" or "porous sulphate of alumina."

Sulphate of alumina, or concentrated alum, as it is sometimes called, when manufactured in the ordinary manner, is a white or nearly white substance, occurring in pieces or fragments usually about from one to two inches thick, and of various superficial area. Its consistence and texture are exceedingly close, dense, and tough, so much so as to be with extreme difficulty reduced to even a coarse powder. Although theoretically readily soluble in water, it is practically almost insoluble; it is hard like flint, and tough like horn, and so extremely close is its texture that water will scarcely penetrate beyond the surface, and it dissolves so very slowly as to render its solution a long and tedious process.

The practical difficulty in either breaking, grinding, or dissolving the sulphate of alumnia, as ordinarily manufactured, has largely hindered its use in place of the ordinary crystallized or powdered alum, over which it has, in other respects, many advantages. My improvement, however, entirely obviates these difficulties, as my new manufacture of porous alum is a snow-white vesicular mass, penetrated in all directions by pores and cavities, so that, in place of being close-textured, tough, and hard, so as to be almost insoluble, and hard to be ground or broken, it is spongy and friable, readily crushed or powdered, and easily and rapidly soluble in water, even in large pieces, because the fluid, entering the pores, penetrates almost immediately to the interior of the mass, permeating and dissolving all the particles at the same instant.

In order to enable others skilled in the art to use my invention, I will proceed to describe the nature of my invention, and some of the modes by which it may be carried into practical use.

Hydrate of alumina, obtained in the usual way, I mix with sulphuric acid and water in about the following proportions, say three hundred pounds (300 lbs.) of wet alumina, containing about thirty-eight per cent. of real hydrate, and about four hundred pounds (400 lbs.) of sulphuric acid of 58° Beaumé. The atomic proportions employed are designed to be such as to form the neutral or slightly basic sulphate of alumina, $Al_2O_3 + 3SO_3 + 18HO$, the amount of water, allowing for the escape in the form of steam during the process, being only enough to afford the water of crystallization required. The result of this mixture is a powerful chemical reaction attended by a great evolution of heat, the formation and escape of steam, and the escape of carbonic-acid gas resulting from the decomposition of the traces of carbonate of soda, where the hydrate of alumina has been obtained by the decomposition of aluminate of soda. This fluid mass soon solidifies into a white porous substance, consisting of the neutral or slightly basic sulphate of alumina, which, if the heat evolved by the chemical reaction has not been so great and long continued as to keep the mass fluid until nearly all the gas and steam resulting from the decomposition have escaped, is porous alum. But, as in the manufacture of large quantities, the action is so violent that the heat evolved raises the temperature of the mass much above the actual boiling-point of the concentrated solution produced, I cause the mixture to be stirred until it becomes cooler and commences slightly to thicken, when a small quantity of bicarbonate of soda in fine powder, in the proportion of about one pound of bicarbonate to about one thousand pounds of the sulphate of alumina, is sprinkled upon the surface and stirred rapidly into the mass, which, when thoroughly mixed and sufficiently cool, is discharged into vessels to harden.

When cold, the resulting product is sulphate of alumina, of vesicular and porous structure, as described before.

This new article of "porous alum" may also be produced by adding to a hot solution of sulphate, or other soluble salt of alumina, which is sufficiently concentrated to solidify in cooling, a small quantity of bicarbonate, or carbonate of soda, potassa, lime, or other alkali or alkaline earth, or other salt of an alkali or alkaline earth, the acid of which is set free in a gaseous or vaporous state under the above circumstances, and rapidly incorporating the said salt therein by stirring, so that the gas, in the act of escaping, may inflate the mass and render it frothy, while in process of cooling and hardening, whereby it becomes full of bubbles and vesicles.

As soon as it is stiff enough, the frothy mass is quickly discharged into suitable vessels or pans for rapidly cooling, so that it may harden before the gas or vapor has had time to disentangle itself from the imprisoning compound.

A like result, though less perfect in its operation, may be obtained by the rapid injection of air, steam, or vapor of water, or other gaseous body, into the mass of dissolved sulphate of alumina, the object being the production of the vesicular and porous condition of the mass when in the act of hardening.

The article of "porous alum" thus obtained, when cold, may be ground in a mill, or reduced to powder, as may be preferred, as any state of division finer or coarser is readily attainable.

Having thus described my improvement,

What I claim as my invention, and desire to secure by Letters Patent, is—

As a new article of manufacture, the sulphate of alumina, prepared in a porous or vesicular state, whether in lump or ground to a coarse or fine powder, substantially as described.

In testimony whereof, I, the said HENRY PEMBERTON, have hereunto set my hand.

H. PEMBERTON.

Witnesses:
 W. BAKEWELL,
 ELL TORRANCE.